United States Patent [19]
Bliven et al.

[11] Patent Number: 6,047,572
[45] Date of Patent: *Apr. 11, 2000

[54] DOCKING STATION WITH MULTI-FUNCTION SECURITY FEATURE

[75] Inventors: Robert Paul Bliven, Corvallis; Ralph Waldo Kinser, Jr., Albany, both of Oreg.

[73] Assignee: Hewlett-Packard Company, Palo Alto, Calif.

[ * ] Notice: This patent is subject to a terminal disclaimer.

[21] Appl. No.: 08/908,540

[22] Filed: Aug. 7, 1997

Related U.S. Application Data

[63] Continuation of application No. 08/621,419, Mar. 25, 1996, Pat. No. 5,692,400.

[51] Int. Cl.[7] ............................................. E05B 69/00
[52] U.S. Cl. ................................ 70/58; 70/62; 361/686
[58] Field of Search ............................... 70/58, 57, 62, 70/14, 18; 248/551, 553; 361/686, 732, 740, 759

[56] References Cited

U.S. PATENT DOCUMENTS

| | | | |
|---|---|---|---|
| 4,659,159 | 4/1987 | Takahashi | 339/75 M |
| 4,941,841 | 7/1990 | Darden et al. | 439/377 |
| 5,142,446 | 8/1992 | Tanaka et al. | 361/393 |
| 5,313,596 | 5/1994 | Swindler et al. | 395/325 |
| 5,323,291 | 6/1994 | Boyle et al. | 361/683 |
| 5,327,752 | 7/1994 | Myers et al. | 70/58 |
| 5,347,115 | 9/1994 | Sherman et al. | 235/472 |
| 5,347,425 | 9/1994 | Herron et al. | 361/683 |
| 5,351,508 | 10/1994 | Kelley | 70/58 |
| 5,381,685 | 1/1995 | Carl et al. | 70/78 |
| 5,384,686 | 1/1995 | Mesfin et al. | 361/686 |
| 5,394,552 | 2/1995 | Shirota | 395/750 |
| 5,447,044 | 9/1995 | Cheng | 70/58 |
| 5,447,045 | 9/1995 | Cheng | 70/58 |
| 5,450,271 | 9/1995 | Fukushima et al. | 361/686 |
| 5,488,572 | 1/1996 | Belmont | 364/514 R |
| 5,493,878 | 2/1996 | Murray, Jr. et al. | 70/58 |
| 5,502,989 | 4/1996 | Murray, Jr. et al. | 70/58 |
| 5,504,648 | 4/1996 | Honda et al. | 361/686 |
| 5,552,959 | 9/1996 | Penniman et al. | 361/686 |

*Primary Examiner*—Flemming Saether
*Assistant Examiner*—Clifford B Vaterlaus

[57] ABSTRACT

A docking station for use with a portable electronic device and a docking system including such a docking station. The docking station includes a stand alone body that is configured to receive a complementary portable electronic device and includes support electronics therefor. The stand alone body is preferably further configured to define a generally transverse pass through opening of sufficient dimension to permit a security implement to be passed wholly through said body.

2 Claims, 8 Drawing Sheets

DOCKING STATION WITH MULTI-FUNCTION SECURITY FEATURE

CROSS REFERENCE TO RELATED APPLICATIONS

This application is a continuation of U.S. patent application Ser. No. 08/621,419, filed on Mar. 25, 1996, and which issued as U.S. Pat. No. 5,692,400, on Dec. 2, 1997.

TECHNICAL FIELD

This invention relates to security measures for preventing theft of portable computers and computer docking systems.

BACKGROUND OF THE INVENTION

Small, portable computers, often referred to as "laptop" computers, have become more and more popular as their capabilities have increased. Laptop computers in many cases provide most or all of the functionality of larger, desktop computers. Because of this, it is not uncommon for a person to use a single laptop computer as his or her only computer.

There are, however, disadvantages to using a laptop computer as a desktop computer. One disadvantage is that a laptop computer is very easy to steal.

Locks are available to address this problem. One type of lock is a device consisting of a cable or tether that can be secured at one end to a desk or other fixture, and at the other end to a computer. This type of lock is typically secured to the computer using a key. Many laptop computers now have receptacles for mating with such locks.

Another disadvantage of a laptop computer in an office environment is that it must be set up and configured for desktop use after every portable use. At the least, this typically involves getting out a power cord and power supply and plugging them into the computer and a power outlet. Often, setting up for desktop use also involves connecting a printer and one or more other peripherals such as an auxiliary keyboard and an auxiliary display. In many situations, it is also necessary to connect the laptop to a local-area network and to configure the computer to use the network.

Docking systems are available for use with some laptop computers to ease the transition from portable use to desktop use. Available docking systems include port replicators, enhanced replicators, and complete docking stations. A docking system is a device with which a laptop computer or other portable computing device mates. The most basic docking system has a set of peripheral ports (such as printer, network, keyboard, and CRT ports) to which computer accessories are connected. Such a docking system has one or more connectors that mate with corresponding connectors on the laptop computer to "extend" the peripheral ports of the laptop computer to the peripheral ports of the docking system. A docking system such as this, that merely extends a set of peripheral ports, is often referred to as a "port replicator." Power might also be directed through a port replicator so that the laptop computer need not be manually plugged in before desktop use. In use, the port replicator is left on a desktop and the laptop computer is simply plugged into the port replicator. Plugging the laptop computer into the port replicator automatically connects the computer to power and to any peripherals connected to the ports of the replicator.

The term "enhanced replicator" is used to refer to port replicators having additional features, such as external bus systems. An external bus system allows the use of expansion cards in conjunction with a mated computer.

The term "docking station" is used to refer to a system that has integrated computer peripherals in addition to replicated ports. For instance, a docking station might include sound peripherals such as speakers, hard disk storage devices, and tape backup systems.

While docking systems are a great convenience, they present an additional theft liability—they are often as easy or easier to steal than laptop computers themselves. In most cases, they must be secured to an office fixture with a tether, while an additional tether is used to secure the laptop computer. This results in an expense and inconvenience that is addressed by the invention described below.

SUMMARY OF THE INVENTION

This invention allows a single tethered locking device to secure both a portable computer and its associated docking system. In one aspect of the invention, an opening is formed in the docking system. The opening is sized and positioned so that a Kensington lock can be passed through the opening and locked into a receptacle on the portable computer. In this embodiment, placing the Kensington lock through the opening interferes with a computer ejection mechanism in the docking system, and thus prevents a user from attempting to eject the docked computer. In another aspect, attaching a Kensington lock to the docking system causes a lock extension to engage the receptacle on the portable computer. In either case, only a single attachment of a Kensington lock is required to lock both the portable computer and its docking system, and to secure them to a desk or other fixture.

DETAILED DESCRIPTION

In a preferred embodiment, the invention utilizes what is known as a "Kensington" anchored lock to secure both a docking system and a docked portable computer. The Kensington lock has become somewhat of a standard locking device for use with portable computers. Many computers are manufactured with provisions for mating with a Kensington lock.

Figure 1:
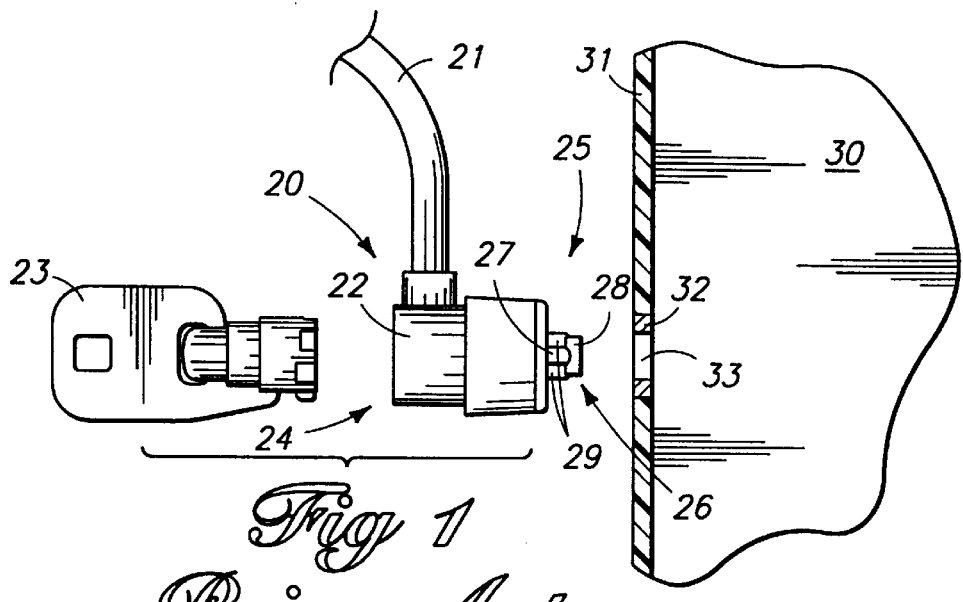
FIG. 1 is a front view of a prior art tethered lock and associated key, shown next to a portable computer having a receptacle for engagement by the tethered lock.
Figure 2:
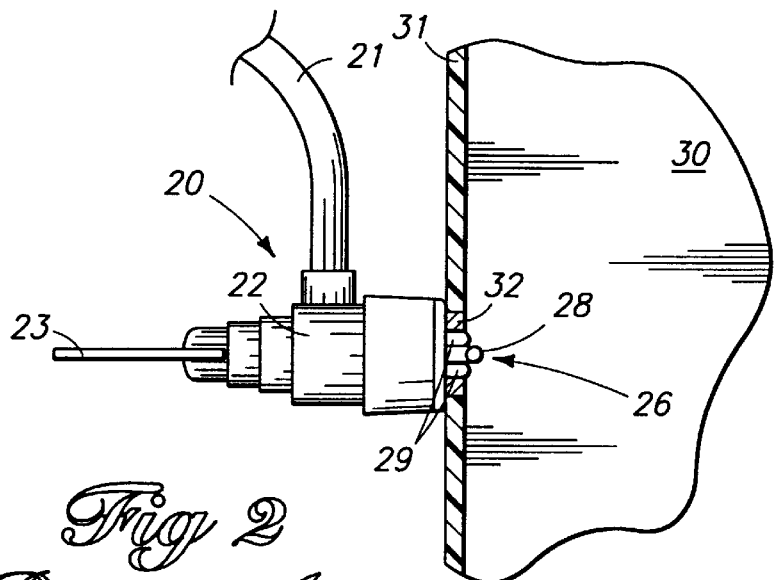
FIG. 2 is a view similar to FIG. 1, showing the tethered lock attached and locked to the portable computer.
Figure 3:
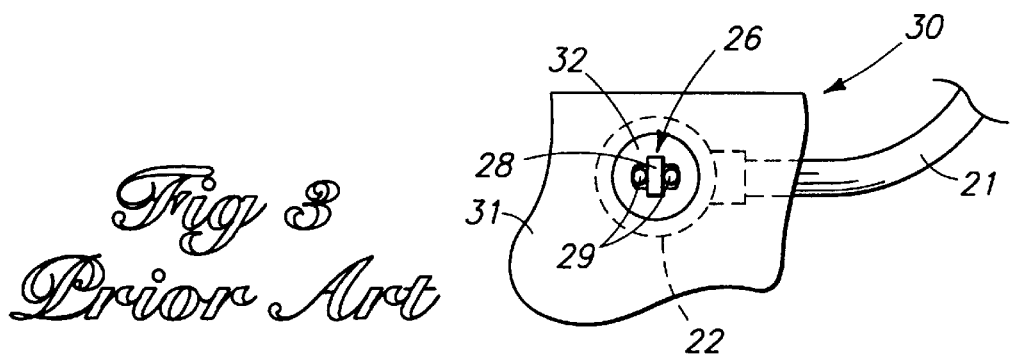
FIG. 3 shows the Kensington lock of FIGS. 1 and 2 attached and locked to the portable computer. This view is taken from the inside of the computer.

A conventional Kensington lock is shown as prior art in FIGS. 1–3, generally referenced by numeral 20. It comprises a lock tether 21, typically formed by a flexible metal cable. An end of the cable not shown has means for permanent attachment to a desk or other relatively stationary office fixture. A lock barrel 22 is attached to the other end of the cable. Lock barrel 22 is cylindrical and houses a locking mechanism (not shown). The locking mechanism accepts a key 23, which is inserted into a first end 24 of the lock barrel. From an opposite, second end 25 of the lock barrel extends a T-shaped lock pin 26, comprising a base 27 and a cross-member 28. Base 27 is a cylindrical shaft that protrudes from second end 25 of lock barrel 22. Cross-member 28 has a cylindrical shape with a diameter the same as that of base 27. Cross-member 28 is formed or attached at the distal end of base 27, perpendicular to base 27. A pair of pegs 29 jut outwardly from the second end 25 of lock barrel 22 parallel and adjacent to base 27. Pegs 29 are mounted to remain in a stationary position relative to lock barrel 22. The base 27 of the T-shaped lock pin is formed and connected to the locking mechanism within barrel 22 so that it can be rotated 90 degrees relative to lock barrel 22 and pegs 29 by turning key 23.

FIG. 1 shows lock 20 with its lock pin 26 rotated to a non-locking position. In this position, cross-member 28 is parallel with a line formed between the two pegs 29, through base 27.

FIG. 2 shows lock 20 mated with a portable computer 30. The portable computer has a case or shell 31 that is manufactured with a locking feature or receptacle included specifically to receive or be engaged by the lock pin of a Kensington lock. The locking feature in the embodiment shown is formed by a metal grommet 32 formed into the shell of computer 30. The metal grommet has a slot 33 that is exposed on the outside surface of the computer. The slot is sized to receive cross-member 28 and pegs 29 when lock pin 26 is rotated to its non-locking position. The pegs are spaced so that they are positioned at the outer ends of slot 33 when lock pin 26 is inserted in this manner.

In use, lock pin 26 of lock 20 is inserted in slot 33 in the side of computer 30. Once inserted, key 23 is turned to rotate the lock pin 90 degrees. This is its position in FIGS. 2 and 3. The two pegs 29, positioned within and at outer ends of slot 33, prevent lock barrel 22 from rotating relative to slot 33. When the lock pin is rotated 90 degrees, cross-member 28 is oriented perpendicularly to the lengthwise dimension of slot 33 and thus extends beyond slot 33. This secures lock 20 to computer 30. To remove the lock, lock pin 26 is rotated back to its original position, whereupon it can be pulled back through slot 33.

FIGS. 4–8 show a docking system 40 in accordance with a first implementation of the invention. Docking system 40 is constructed for use with a portable computer 41. Computer 41 might be any one of a variety of personal computers or personal computing devices, such as a laptop computer, palmtop computer, personal digital assistant (PDA), or electronic organizer. In FIGS. 4–8, computer 41 is a "clamshell" laptop computer, with a display integrated in a panel that folds up. The display panel is shown in its closed position in FIGS. 4–8.

Figure 8:
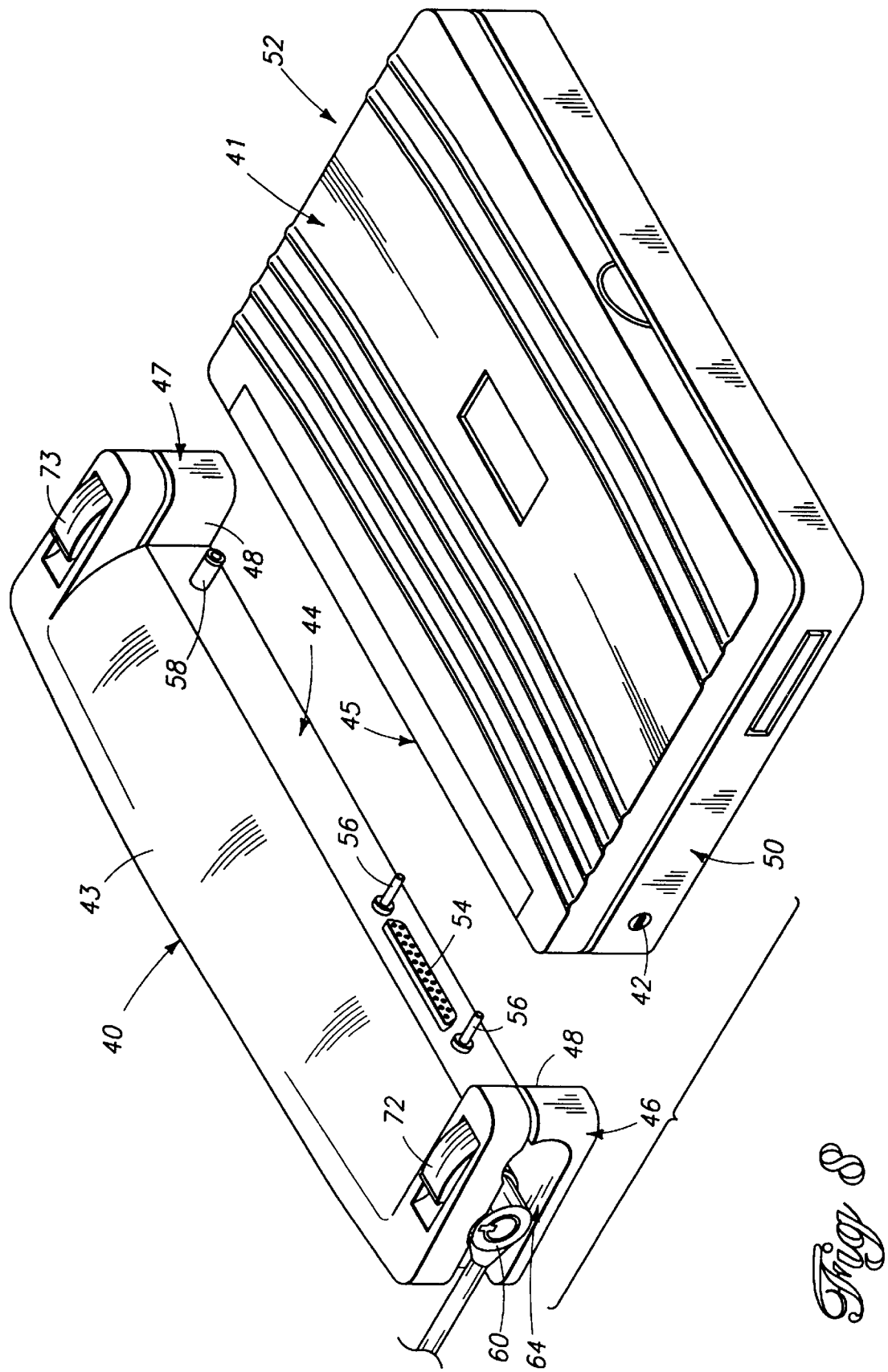
FIG. 8 is a top perspective view of the docking system and portable computer of FIG. 4, showing the portable computer removed from the docking system and the tethered lock attached to a secondary lock receptacle on the docking system.

Computer 41 is of a type having a locking feature or lock receptacle 42 formed in its case toward the rear of its left side (FIG. 8). Lock receptacle 42 is similar or identical to such features commonly in use for engagement by anchored Kensington locks to prevent computer theft. It comprises a slot that is sized to receive the lock pin of a Kensington lock.

Docking system 40 might be any one of a variety of available docking systems, including port replicators, enhanced port replicators, and docking stations. In the embodiment shown, docking system 40 has a body or shell 43 formed of an appropriate metal or plastic. Referring for the moment to FIG. 8, body 43 forms a transverse surface 44 extending behind the back side 45 of computer 41 when computer 41 is docked with the docking system. Body 43 further includes two arms 46 and 47 that extend forward at the outer ends of body 43. The arms form inner surfaces 48 that are positioned along left and right sides 50 and 52 of computer 41 when computer 41 is docked. Surfaces 44 and 48 form a receiving portion in body 43 for receiving and docking computer 41.

One or more electrical connectors 54 and mechanical guides 56 are positioned in transverse surface 44 to mate with complementary features on back side 45 of computer 41 when computer 41 is docked. The docking system also includes ejection pins 58 (only one of which is shown) that are activated by mechanisms within body 43 (not shown) to push computer 41 from docking system 40 when the owner of the computer wants to undock computer 41.

Figure 4:
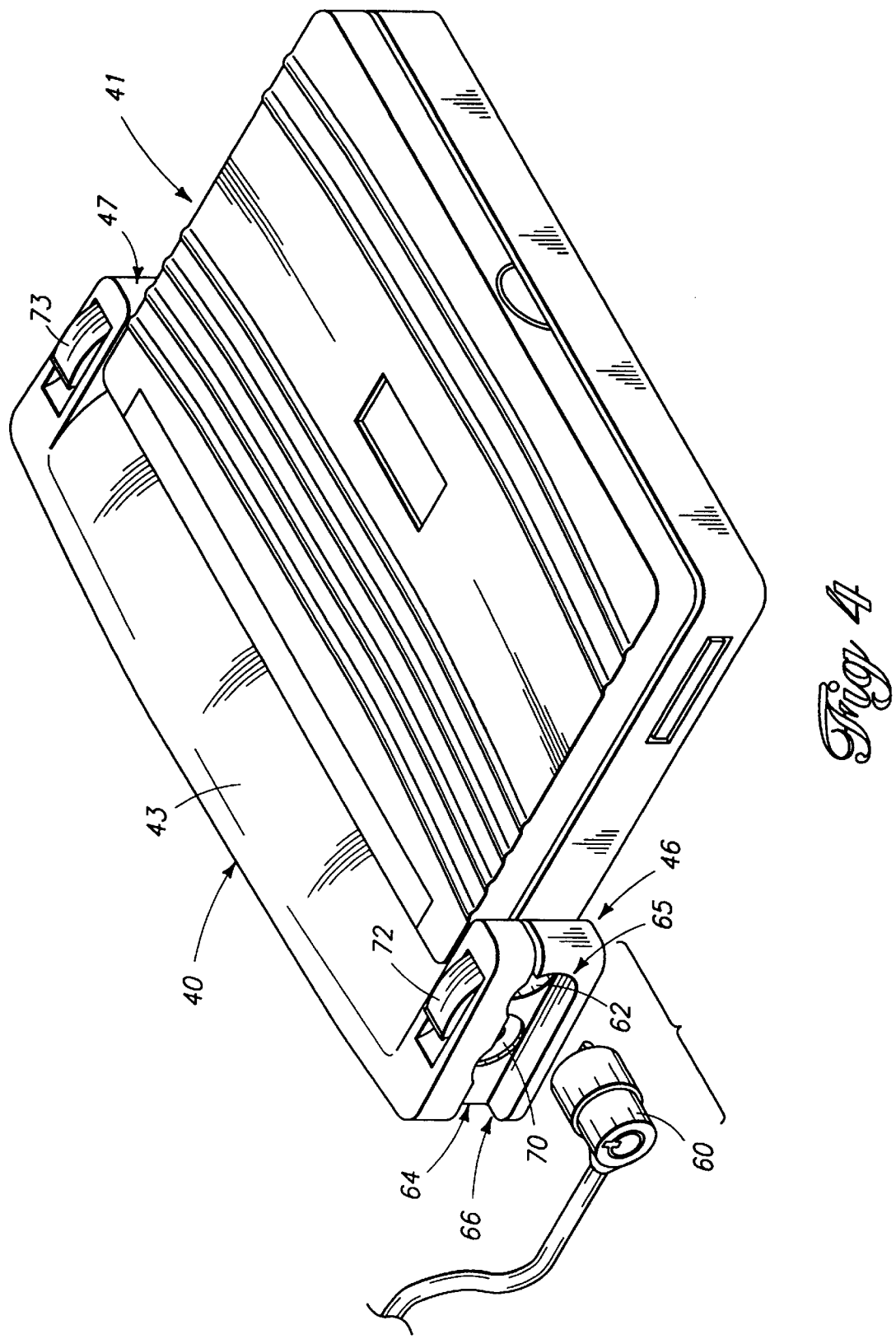
FIG. 4 is a top perspective view of a docking system and associated portable computer in accordance with a first implementation of the invention, with a tethered lock being shown in a removed position.

FIG. 4 shows computer 41 docked with docking system 40. When positioned as shown, the receiving portion of body 43 is located adjacent lock receptacle 42 of computer 41. More specifically, lock receptacle 42 slides into the receiving portion adjacent inner surface 48 of left arm 46.

The body 43 of docking system 40 has receptacle means in its receiving portion for receiving an anchored Kensington lock 60 and for securing the anchored lock to both computer 41 and docking system body 43. In the illustrated implementation, the receptacle means comprises an opening 62 through the receiving portion of body 43. The opening is sized to receive anchored lock 60 therein and is positioned to allow the anchored lock to engage lock receptacle 42 of computer 41 when computer 41 is docked. Opening 62 is cylindrical, and has a size and diameter that is generally complementary to the diameter of the barrel of Kensington lock 60 to matingly receive the lock barrel when inserted therein. The computer lock receptacle 42, comprising a slot on the left side of computer 41, is exposed through opening 62.

Figure 6:
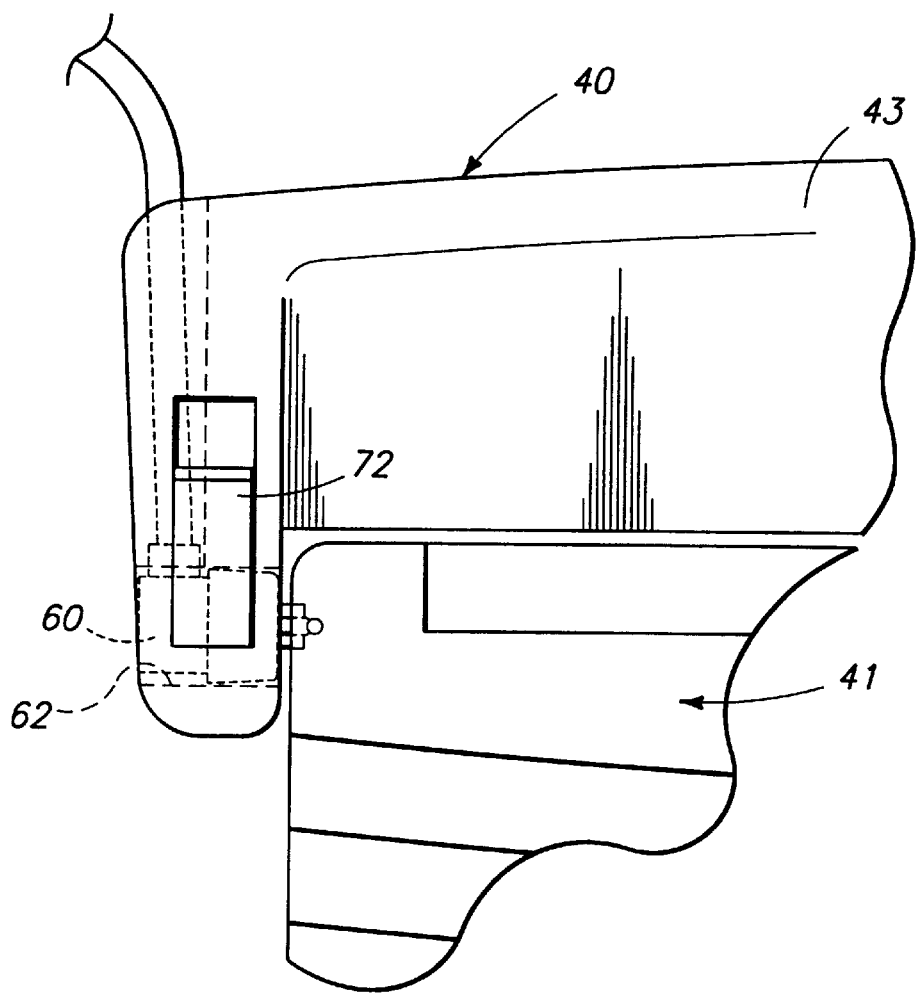
FIG. 6 is a top view of the docking system and portable computer of FIG. 4, showing the tethered lock in dashed lines, in a locked position.
Figure 7:
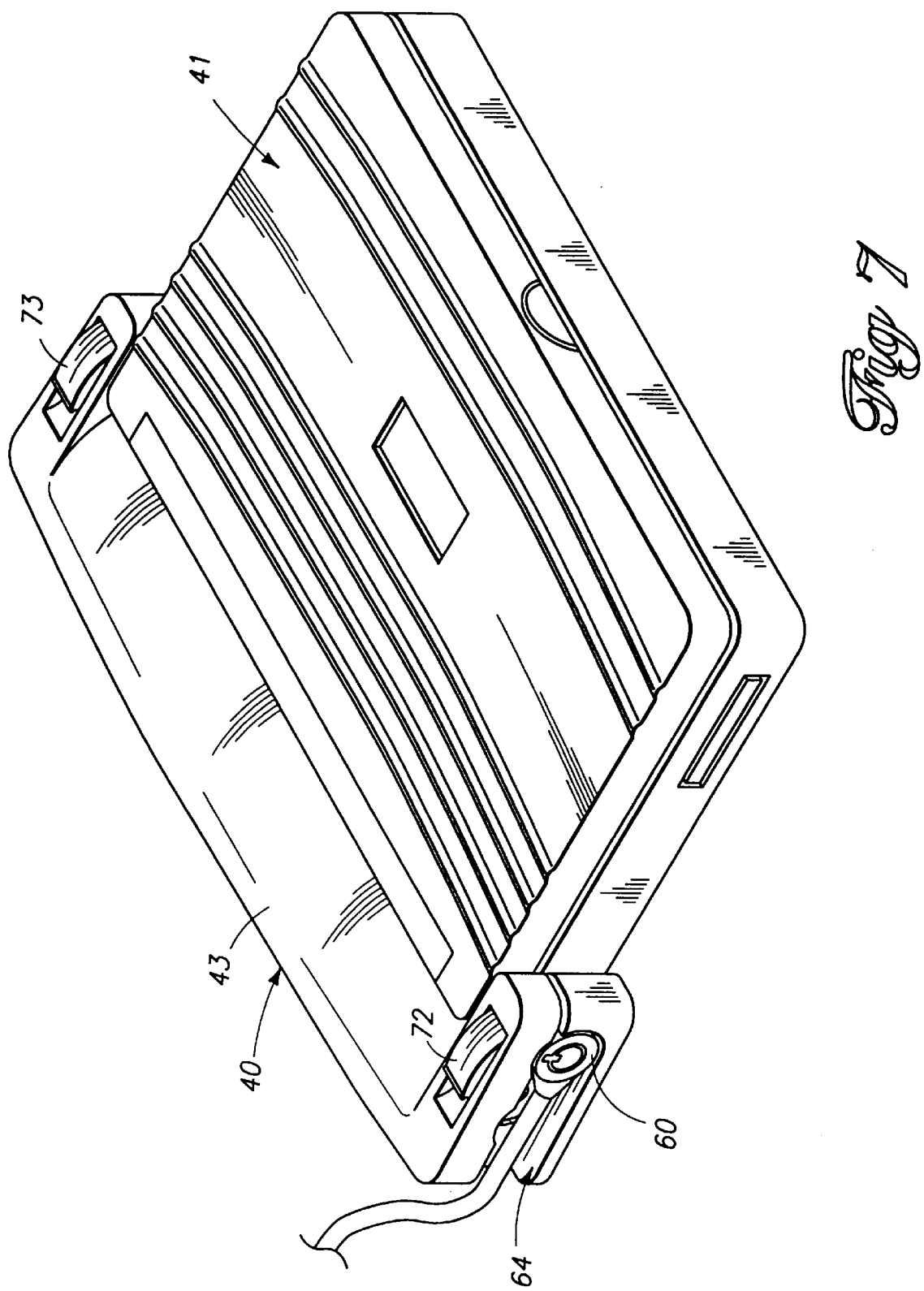
FIG. 7 is a top perspective view similar to FIG. 4, showing the tethered lock in a locked position.

In use, computer 41 is first docked with docking system 40. Kensington lock 60 is then inserted into and through opening 62 and the T-shaped lock pin of lock 60 is positioned through the slot of the computer's lock receptacle 42. A key (not shown) is used to turn the lock pin of the Kensington lock, thereby securing the Kensington lock to computer 41. FIGS. 6 and 7 show lock 60 in this locked position. When lock 60 engages lock receptacle 42 of computer 41 in this manner, it secures both the docking system and the computer against theft.

A channel 64 is formed along the outside of left arm 46 of docking system body 43 to receive the flexible tether of Kensington lock 60. The channel extends from a forward extent 65 (labeled in FIG. 4), coinciding with opening 62 at a forward side of arm 46, to a rearward extent 66 (also labeled in FIG. 4) at the rearward side of body 43. The channel is sized to receive the tether of a conventional Kensington lock when the lock is in its locked position within opening 62.

Figure 5:
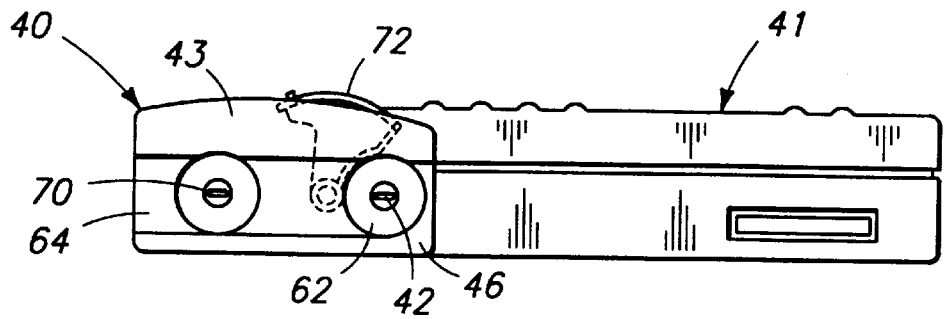
FIG. 5 is a side view of the docking system and portable computer of FIG. 4, shown without the tethered lock.

Docking system 40 further includes its own Kensington lock receptacle 70, positioned behind opening 62 within channel 64 (FIGS. 4 and 5). Lock receptacle 70 includes a slot that is sized to work with a conventional Kensington lock. Lock receptacle 70 is used to secure docking system 40 when computer 41 is not present, as shown in FIG. 8. When lock 60 is attached to lock receptacle 70, the tether of lock 60 is positioned within channel 64.

Docking system 40 also includes an ejection mechanism in body 43. The ejection mechanism is activated by a pair of levers 72 and 73. Levers 72 and 73 can be pulled forward to undock computer 41. The levers are connected by internal mechanisms (not shown) to operate ejection pins 58. When the levers are pulled, the ejection pins are pushed outward to push computer 41 away from docking system 40. Some docking systems, including the one shown in FIGS. 4–8, have an interlock mechanism associated with the ejection mechanism to allow ejection only after the docked computer has authorized such ejection.

In the implementation shown in FIGS. 4–8, opening 62 is positioned to place the barrel of anchored lock 60 in an interfering relationship with the ejection mechanism when the anchored lock engages lock receptacle 42 of computer 41. Specifically, opening 62 places the lock barrel immediately in front of left lever 72. This is best shown in FIG. 5. The forward pivoting of lever 72 is blocked by the barrel of lock 60 when lock 60 is positioned within opening 62. Blocking operation of the ejection mechanism when the computer is secured to docking system 40 by lock 60 prevents possible damage to the ejection mechanism.

The invention includes the features shown in FIGS. 4–8 as well as the methodical steps involved in using these features. One such step comprises docking the portable computer adjacent the receiving portion of the docking system. Another step comprises passing a Kensington lock through the opening in the receiving portion of the docking system. A further step includes engaging the lock receptacle of the portable computer with the Kensington lock while the Kensington lock is passed through the opening in the receiving portion of the docking system. In this position, the Kensington lock secures both the docking system and the portable computer. A further, optional step comprises positioning the opening in the receiving portion to place the Kensington lock in an interfering relationship with the portable computer ejection mechanism when the Kensington lock is passed through the opening in the receiving portion.

FIGS. 9–12 show a docking system 100 in accordance with a second implementation of the invention. Docking system 100 is similar in many respects to the docking system of FIGS. 4–8. It includes a body or shell 102 that forms a receiving portion between a pair of arms 104 and 105. A computer 106 is intended to be placed and docked in the receiving portion, between the pair of arms. Computer 106 has a lock receptacle 107 for use with a Kensington lock, positioned on the left side of computer 106 similarly to the placement of the lock receptacle shown in FIG. 8.

Like docking system 40 of FIGS. 4–8, docking system 100 includes receptacle means in its receiving portion for receiving an anchored Kensington lock (in this case designated by reference numeral 108) and for locking the anchored lock to both a docked portable computer and to the docking system itself. In this case, however, the receptacle means comprises a Kensington lock receptacle in body 102 in combination with a lock extension through the receiving portion of body 102.

Figure 9:
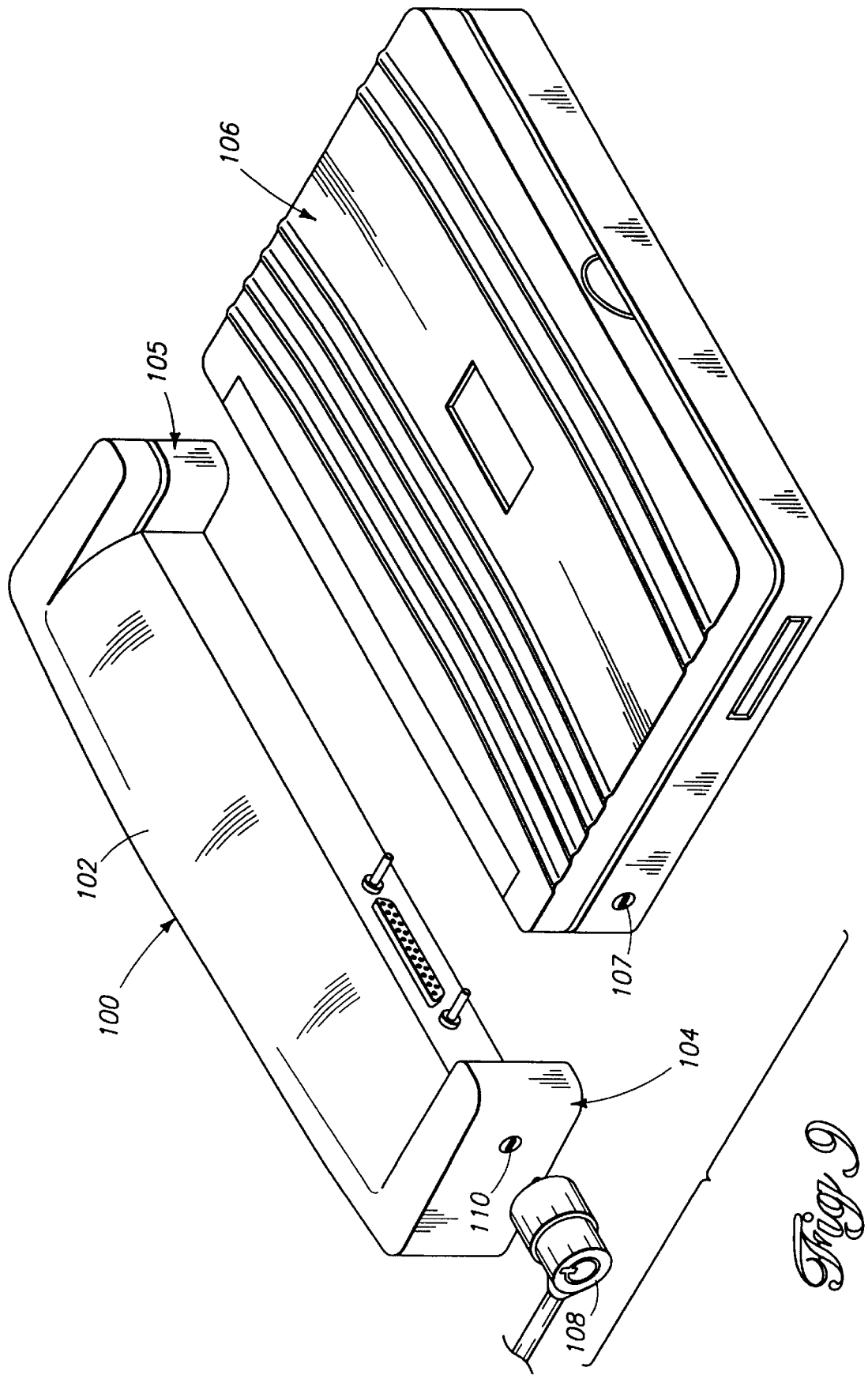
FIG. 9 is a top perspective view of a docking system and portable computer in accordance with a second implementation of the invention. The computer is shown in a non-docked position, and the tethered lock is shown in a removed position.

FIG. 9 shows the Kensington lock receptacle, designated by reference numeral 110. It is located on the outer surface of left arm 104, opposite the location of the computer's lock receptacle 107 when the computer is docked. Lock receptacle 110 comprises a conventional slot that is sized and shaped to receive and be engaged by the T-shaped lock pin of Kensington lock 108.

Figure 10:
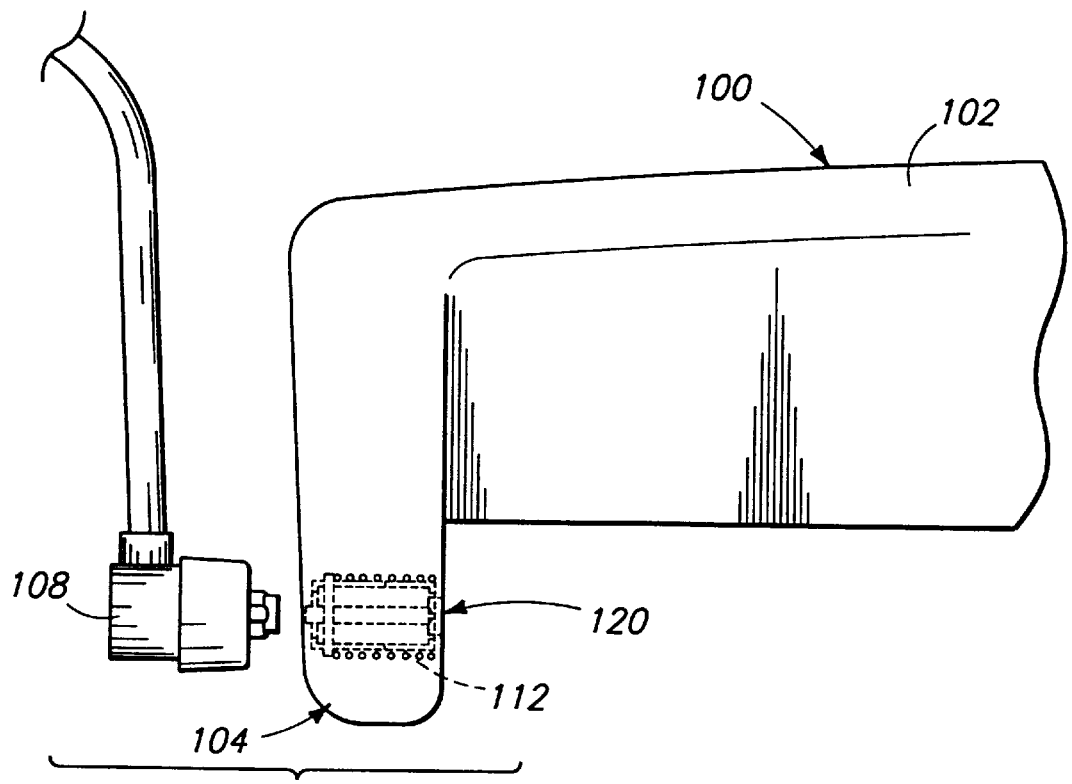
FIG. 10 is a partial top view of the docking system and tethered lock of FIG. 9, with the tethered lock again being shown in a removed position.
Figure 11:
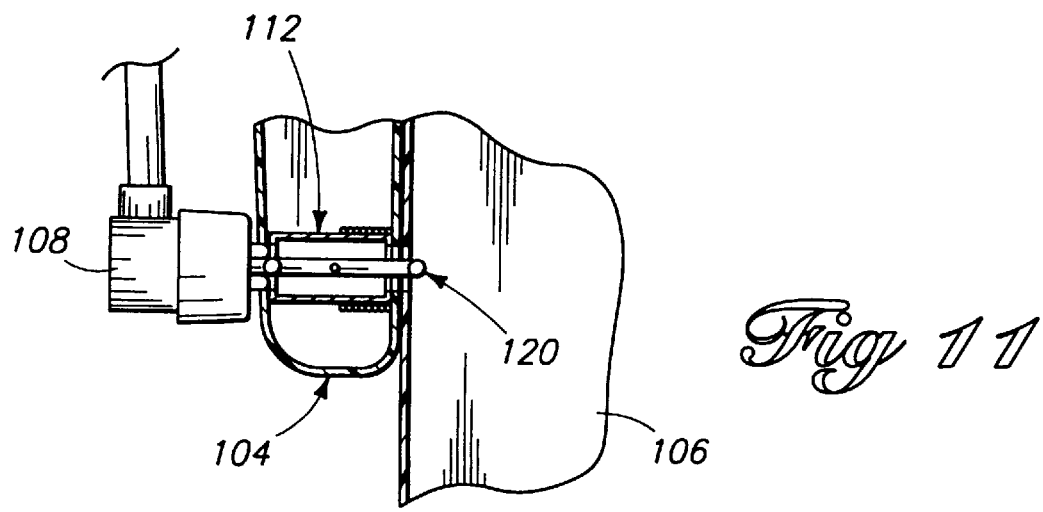
FIG. 11 is partial top view showing the docking system, portable computer, and tethered lock of FIG. 9, with the docking system and portable computer being broken away to show internal elements. The tethered lock is shown in an engaged and locked position.
Figure 12:
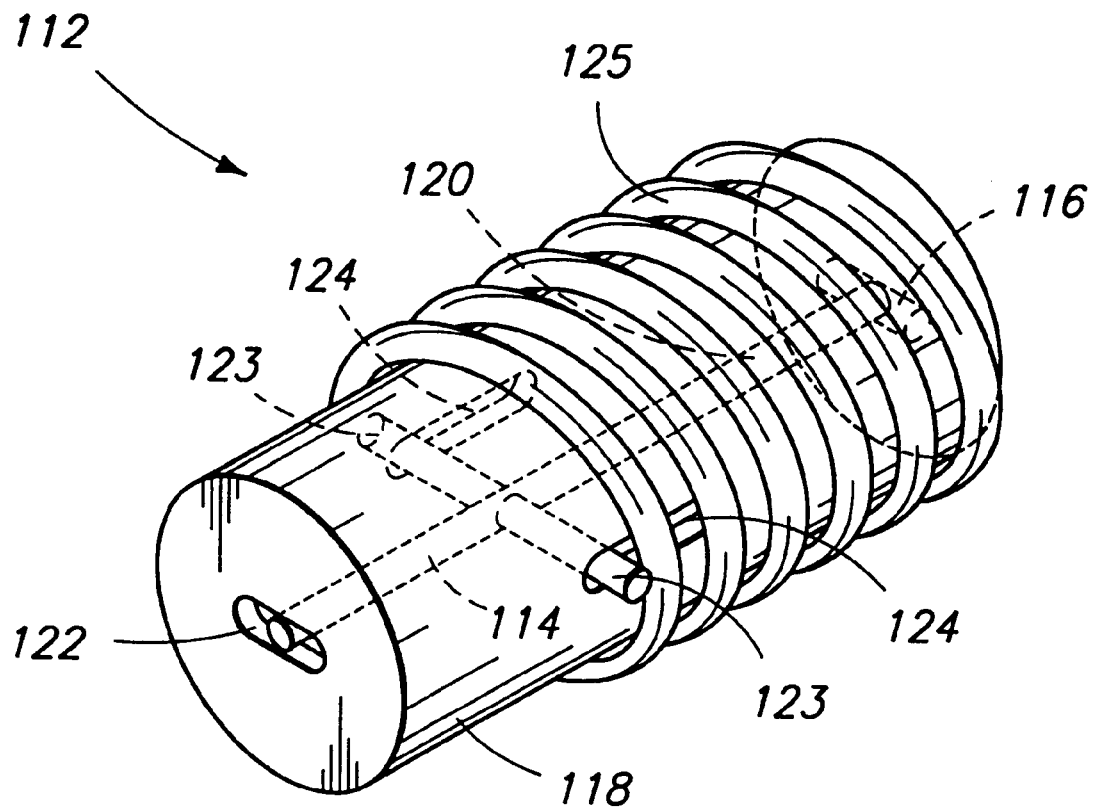
FIG. 12 is a perspective view of a lock extension in accordance with the second implementation of the invention.

The lock extension is shown in FIGS. 10, 11, and 12, designated by reference numeral 112. Lock extension 112 is a device, mounted through the receiving portion of docking system 100, that is movable by Kensington lock 108 to engage lock receptacle 107 of computer 106 when lock 108 engages the lock receptacle 110 of docking system body 102.

As best shown in FIG. 12, lock extension 112 comprises a rotatable T-shaped extension pin 120 that is movable between an extended position and a withdrawn position. The T-shaped extension pin extends from a proximal end (toward the left of left arm 104 in FIG. 12) to a distal end (toward the right of left arm 104 in FIG. 12). The distal end of extension pin 120 is shaped identically to the lock pin of a conventional Kensington lock, so that it can be received within lock receptacle 107 of computer 106. Extension pin 120 thus comprises a base 114 that extends through left arm 104, with a cross-member 116 at its distal end.

A cylindrical or tubular barrel 118 is positioned coaxially with T-shaped extension pin 120. More specifically, T-shaped extension pin 120 is located centrally within barrel 118. Barrel 118 is mounted within left arm 104 for rotation about the axis of extension pin 120. It has a slot 122 sized to receive the cross-member of Kensington lock 108 and to rotate with the T-shaped lock pin of Kensington lock 108.

Extension pin 120 is keyed to barrel 118 to rotate therewith. More specifically, extension pin 120 has arms 123 that extend radially outward from base 114 through longitudinal slots 124 in barrel 118. The slots are oriented lengthwise along barrel 118, and thus force extension pin 120 to rotate with barrel 118. However, the slots allow extension pin 120 to move between a withdrawn position and an extended position, along the lengthwise direction of barrel 118. A coiled spring 125 biases extension pin 120 to its withdrawn position (as shown in FIG. 12).

In its withdrawn position, the distal end of extension pin 120 does not extend significantly from the inner surface of left arm 104 (FIG. 10). This allows computer 106 to be placed between arms 104 and 105. The proximal end of extension pin 120 extends into the center of the slot formed by lock receptacle 110 on the outer surface of left arm 104, so that inserting the lock pin of Kensington lock 108 pushes the extension pin toward its extended position. In the extended position, the distal end or cross-member 116 of extension pin 120 is moved into lock receptacle 107 of computer 106 (FIG. 11). Turning or locking the Kensington lock rotates barrel 118 and thus rotates extension pin 120. This, in turn, rotates cross member 116 to fasten the extension pin 120 to the computer.

FIG. 10 shows extension pin 120 in its withdrawn position. In FIG. 10, Kensington lock 108 has been inserted and turned to its locked position, pushing extension pin 120 into engagement with lock receptacle 107 and turning it to lock it within lock receptacle 107.

The invention solves, in an economical manner, the problem of securing both docking systems and attached computers. This is accomplished while maintaining the use of conventional tethered lock devices such as Kensington locks. The invention allows a single Kensington lock to secure both a docking station and a docked computer.

In compliance with the statute, the invention has been described in language more or less specific as to structural and methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A docking station for use with a portable electronic device, comprising:

a stand alone body configured to receive a portable electronic device into a docked position;

means provided within said body for electronically communicating with a portable electronic device in the docked position;

a lock receptacle provided in an exterior surface of said body;

a lock extension mounted through said body at said lock receptacle, the lock extension being movable upon insertion of a security implement into said lock receptacle so as to protrude from another surface of said stand alone body to engage a portable electronic device in the docked position.

2. The docking station of claim 1, wherein said lock extension comprises a rotatable T-shaped extension pin that is movable between an extended position in which the extension pin protrudes from said body and a withdrawn position in which the extension pin does not protrude from said body, the T-shaped extension pin being biased toward its withdrawn position.

* * * * *